TERMINAL APPLICATOR CONSTRUCTION

Original Filed Dec. 16, 1948 6 Sheets-Sheet 1

INVENTOR
George John Handel, Jr.
BY
Curtis, Morris & Safford
ATTORNEYS

TERMINAL APPLICATOR CONSTRUCTION

Original Filed Dec. 16, 1948 6 Sheets-Sheet 2

INVENTOR
George John Handel, Jr.
BY
Curtis, Morris & Safford
ATTORNEYS

TERMINAL APPLICATOR CONSTRUCTION

Original Filed Dec. 16, 1948 6 Sheets-Sheet 3

INVENTOR
George John Handel, Jr.
BY
Curtis, Morris & Safford
ATTORNEYS

TERMINAL APPLICATOR CONSTRUCTION

Original Filed Dec. 16, 1948 6 Sheets-Sheet 4

INVENTOR
George John Handel, Jr.
BY
Curtis, Morris & Safford
ATTORNEYS

TERMINAL APPLICATOR CONSTRUCTION

Original Filed Dec. 16, 1948

INVENTOR
George John Handel, Jr.
BY
Curtis, Morris & Safford
ATTORNEYS

TERMINAL APPLICATOR CONSTRUCTION
Original Filed Dec. 16, 1948 6 Sheets-Sheet 6
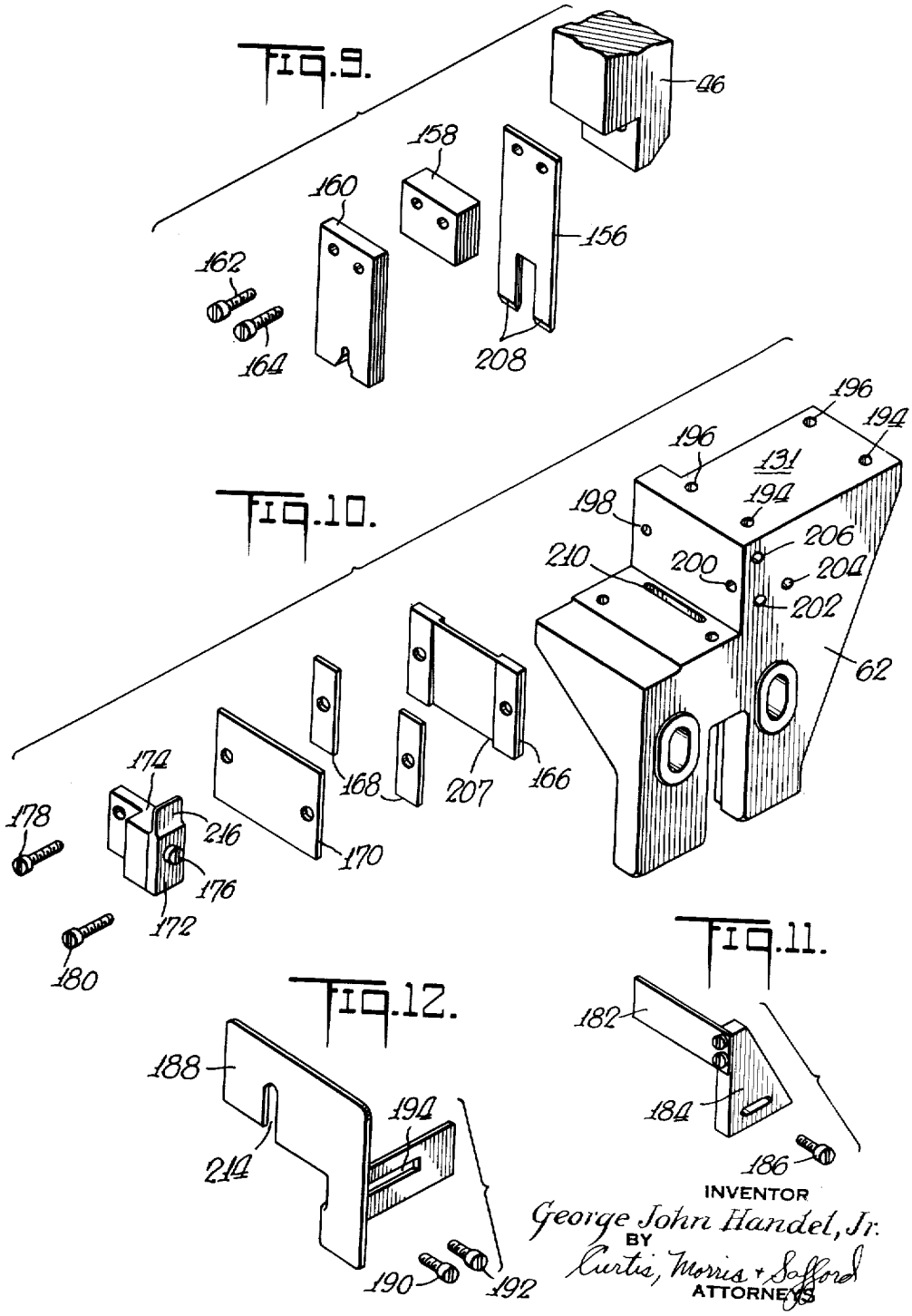
INVENTOR
George John Handel, Jr.
BY
Curtis, Morris & Safford
ATTORNEYS United States Patent Office Re. 25,423
Reissued July 23, 1963

25,423

TERMINAL APPLICATOR CONSTRUCTION

George J. Handel, Jr., Camp Hill, Pa., assignor to AMP Incorporated, a corporation of New Jersey Original No. 2,705,797, dated Apr. 12, 1955, Ser. No. 65,646, Dec. 16, 1948. Application for reissue Aug. 1, 1958, Ser. No. 755,830
6 Claims. (Cl. 1—177)

Matter enclosed in heavy brackets [ ] appears in the original patent but forms no part of this reissue specification; matter printed in italics indicates the additions made by reissue.

This invention relates to a terminal applicator construction for automatically applying an electrical terminal or connector to a piece of wire. As set forth herein the construction includes a region of terminal application protected by a safety guard and is so constituted that when an operator inserts a wire through the guard into the region of terminal application and actuates a press arrangement, a preformed terminal blank from a supply of blanks associated with the applicator is automatically and instantly applied to the wire to make a permanent and electrically efficient connection therewith.

In the illustration of the invention here given my applicator construction forms a part of a press assembly incorporating a reel of preformed electrical terminals integrally attached in end-to-end fashion. Each terminal includes an ordinary ring tongue and a ferrule-forming portion. The ferrule-forming portion embodies a trough-like base which, upon application, will embrace a wire, and an ear projecting upwardly on each side of the base presenting with the base a U-shaped cross section as viewed perpendicular to the ferrule axis. Upon application these areas are crimped into intimate contact with the wire. The strip of terminals per se is not a part of my invention but is broadly described and claimed in an application of William S. Watts, filed December 14, 1943, Serial No. 514,214, now abandoned. Other modifications of preformed terminals useful for automatic applications and other applicator constructions and modifications thereof than the one specifically described hereinafter embodying my invention will readily occur to those skilled in the art.

Various mechanisms have been proposed heretofore for performing the same general functions as my constructions. Most of these have embodied a press of general application modified to support a crimping and feeding mechanism. Some of these machines have been satisfactory, as where the demand of the user was for a huge number of identical terminals applied to an equally huge number of identical pieces of wire such that the machines could be elaborately set up and adjusted with full knowledge that the great number of terminals installed would reduce the cost per unit sufficiently to make the initial investment recoverable. In general, however, it has not been a simple matter to put these machines into operation or to change these machines to adapt them to applying a different kind of terminal to some other kind of wire. And there has long remained an unsupplied demand for a compact, relatively lightweight automatic machine which could easily be adapted to apply automatically any one of a considerable variety of electrical terminals or connectors.

A machine incorporating my invention can supply this demand and at the same time be so constructed and arranged that most of the parts in the organization can be inexpensively produced. The result is that my applicators can be maintained in optimum condition by an ordinary mechanic superficially familiar with lightweight production machinery and without the help of a tool maker or setup man. All of the parts are readily assembled or disassembled and the only pieces which are subject to appreciable wear may readily be obtained as stock parts and installed without extraordinary skill. In addition, when changing an applicator to enable it to install a different kind of terminal, the changes necessary can readily be accomplished simply by unbolting a few parts, as will be described hereinafter, and by assembling from a stock of parts, in accordance with a simple set of instructions, a crimping and shearing assembly suitable for applying the terminals desired.

These attributes are of particular importance when it is borne in mind that these terminal applicators find their primary utility in production rooms where electrical harnesses are being fabricated, electronic chassis wired, or the like, and where semi-skilled electrical assemblers are common but tool makers, setup men, and skilled machinists are, in effect, unavailable except upon special prearrangement and then only at considerable expense. To have a machine operable, convertible from one terminal to another, and requiring no precise setup or adjustment means the difference between efficient operation on the one hand and spoilage of parts, delays and annoyance to all concerned on the other.

It is an object of my invention to provide a terminal applicator construction of the character described having to a notable extent the capabilities and characteristics set forth. A further objective is to provide an applicator which overcomes certain disadvantages inherent in previous machines intended for performing the same general functions as mine. A further objective is to provide a lightweight, low cost applicator assembly in which a terminal feeding mechanism and a terminal applying mechanism can be installed and maintained by an ordinary mechanic. Another object is the provision in a press of a practicable apparatus for applying terminals in which any one of several terminal feeding relationships may be selected and with which any one of several terminal applying assemblies may be combined all as a matter of mere routine. A further objective is to provide a simple and low cost applicator construction which can be adapted by an ordinary maintenance worker to applying any one of a large variety of electrical terminals. Another objective is to provide a terminal applying machine wherein only a few wearing parts are present and in which all of the wearing parts may readily be replaced without requiring the services of a skilled mechanic. A still further object resides in the provision of a feeding assembly wherein the length of feed may readily and accurately be adjusted. Yet another object is to provide a terminal applicator assembly combined from a selection of parts from a stocked range of standard parts and so constituted that it may be installed as a whole into a standard press. A further object is to provide an automatic terminal applying machine which is sufficiently lightweight to permit movement from place to place in a plant as needs arise, which does not require a large initial capital investment, and which can be so easily converted to use with any one of a wide variety of terminals as to render its use feasibly on what have heretofore been considered as small lot production runs. Other objects will in part be pointed out as the description proceeds and will in part become apparent therefrom.

The invention accordingly consists in the features of construction, combinations of elements, methods of operation and arrangements of parts as will be exemplified in the structure and sequences and groups of related steps to be hereinafter described and the scope of the application of which will be set forth in the accompanying claims.

In this specification and the accompanying drawings I have shown and described a preferred embodiment of my invention and suggested various modifications thereof; but it is to be understood that these are not intended to be exhaustive nor limiting of the invention but, on the contrary, are given for purposes of illustration in order that others skilled in the art may fully understand the invention and the principles thereof and the manner of applying it in various forms, each as may be best suited to the conditions of a particular use.

In the drawings:

FIGURE 9 is an exploded perspective view of those parts of the applicator assembly which are carried by the ram of the press;

FIGURE 10 is an exploded perspective view of some of the parts of the applicator assembly which are carried by the bed of the press;

FIGURE 11 is an exploded perspective view of the terminal stripper which forms a part of the applicator assembly; and FIGURE 12 is an exploded perspective view of a guard which forms a part of the applicator assembly.

Figure 1:
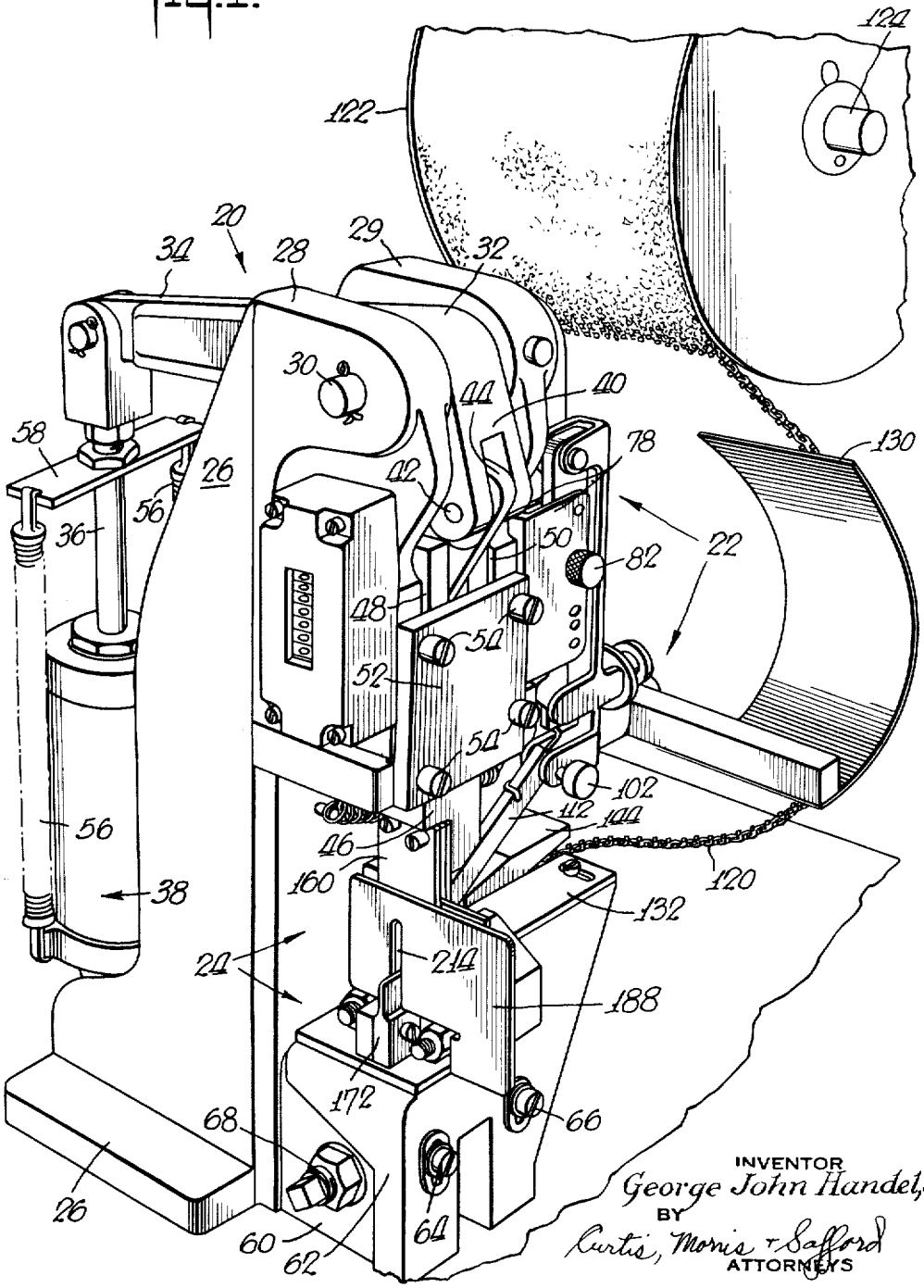
FIGURE 1 is a perspective view of an exemplary machine embodying my invention.
Figure 2:
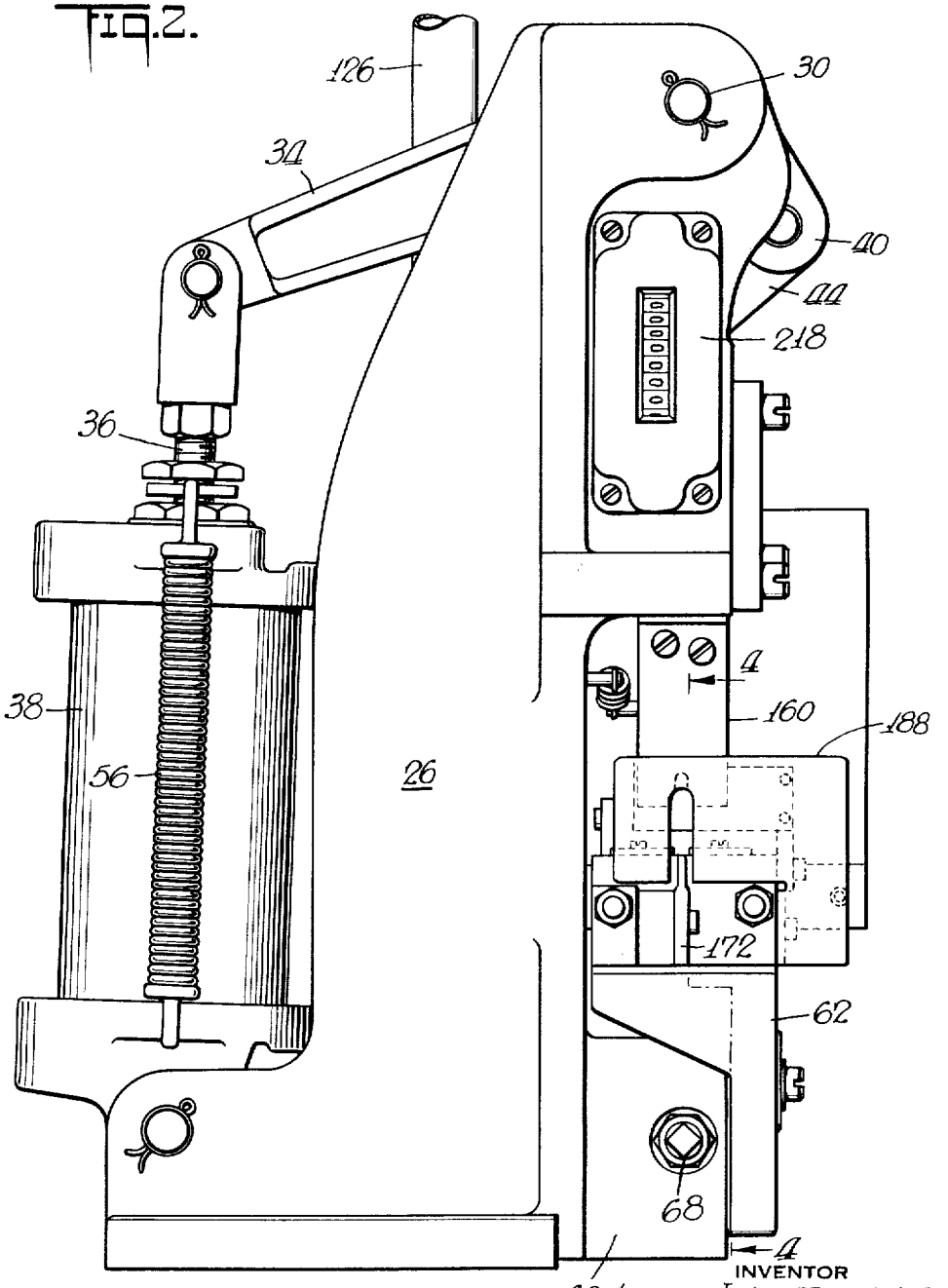
FIGURE 2 is a front elevation of the machine illustrated in FIGURE 1.
Figure 3:
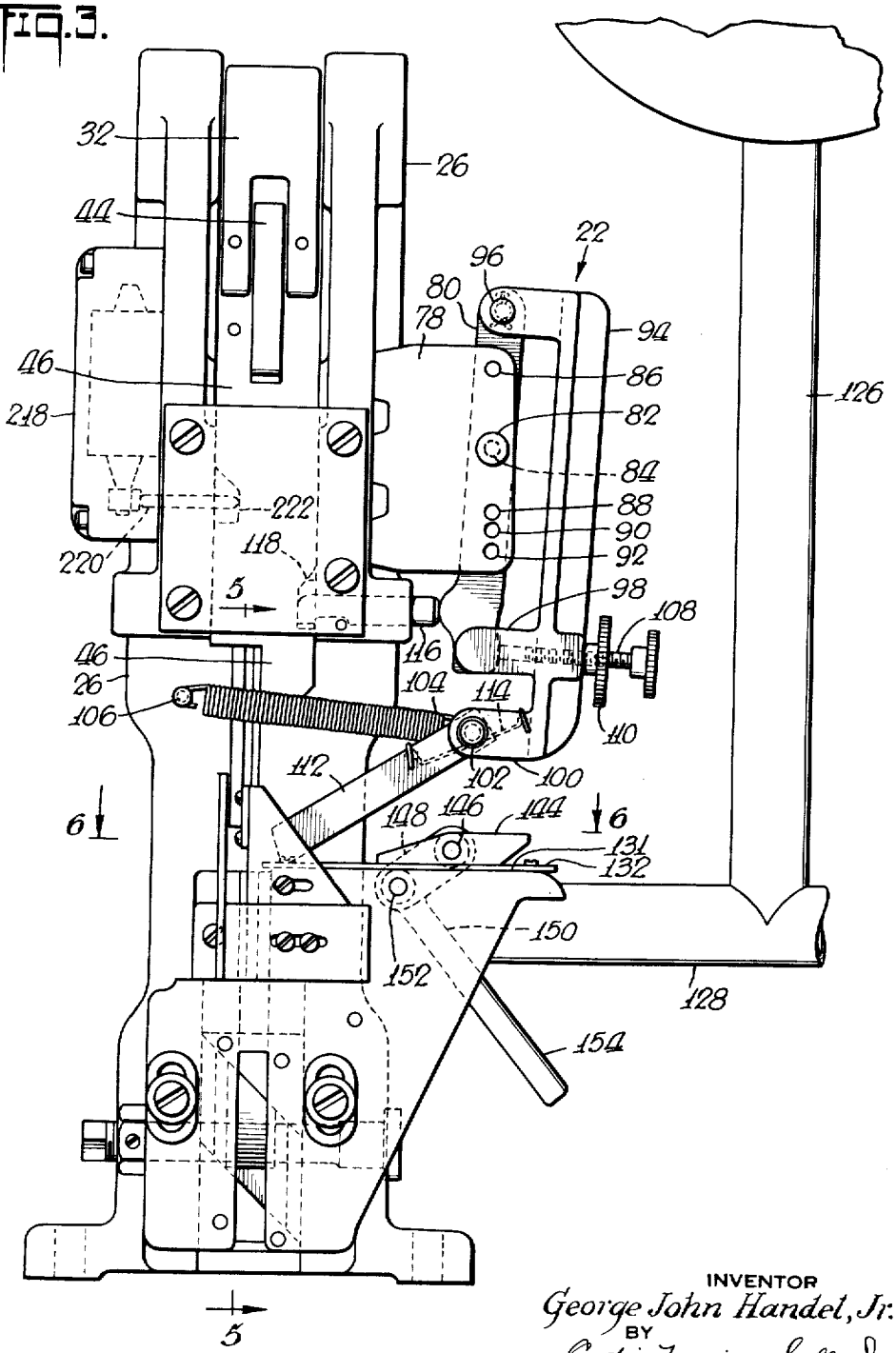
FIGURE 3 is a side elevation of the machine illustrated in FIGURE 1.

FIGURES 1, 2 and 3 illustrate one embodiment of the invention in a machine consisting essentially of a press generally indicated at 20, a terminal feeding assembly generally indicated at 22, and a terminal applicator generally indicated at 24. The press includes a relatively rugged casting 26, the upper portions of which form a pair of arbor mounts 28 and 29 in which is fixed an arbor 30. The arbor forms the pivot for a rocking bar 32, one end 34 of which is coupled to a piston rod 36 forming a part of a power unit; in the present embodiment the power unit takes the form of a pneumatically operated cylinder generally indicated at 38. The other arm 40 of the rocking bar carries a transversely disposed toggle pin 42 upon which is journaled a toggle link 44 (see FIGURE 3). The lower end of link 44 is pivotally pinned to the upper end of a ram 46. Ram 46 is constrained to vertical movement within the body of casting 26 with the aid of guide faces 48 and 50 and plate 52. For purposes of disassembly, inspection, or otherwise plate 52 may readily be removed by unscrewing machine screws 54.

In the illustrative form of press the parts normally occupy the relationship illustrated in FIGURE 1 wherein ram 46 is at the top of its stroke and the piston within cylinder 38 is at the bottom of the cylinder. The parts are returned to this position of rest by tension springs 56 which are spread between a yoke 58 retained on piston rod 36, and the bottom of the cylinder. When air under pressure is supplied to cylinder 38 its piston is forced upwardly carrying arm 34 with it and forcing arm 40 downwardly.

Figure 5:
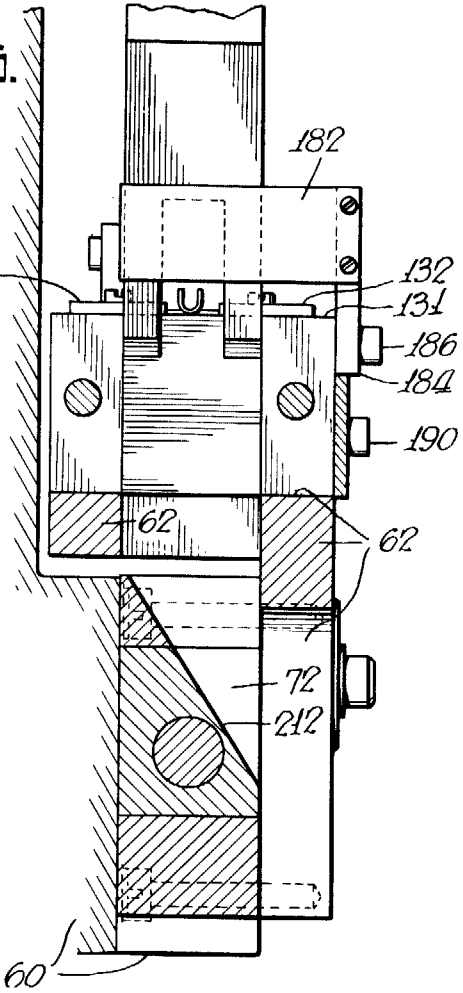
FIGURE 5 is a sectional view taken on an enlarged scale along the line 5—5 of FIGURE 3.
Figure 4:
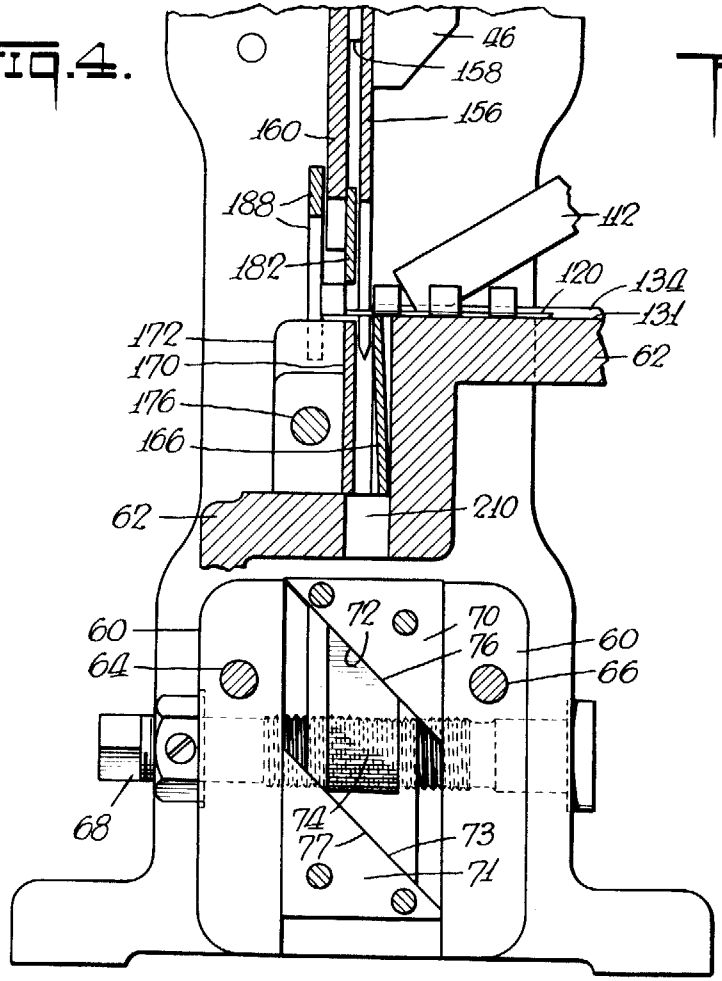
FIGURE 4 is a sectional view taken on an enlarged scale along the line 4—4 of FIGURE 2.
Figure 6:
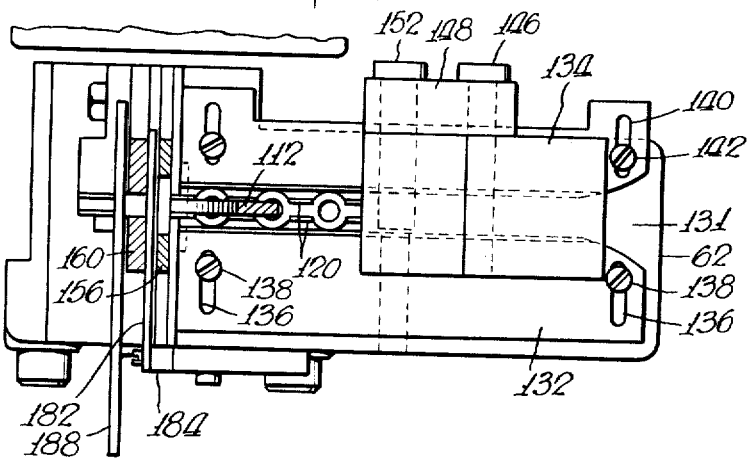
FIGURE 6 is an enlarged sectional view taken along the line 6—6 of FIGURE 3.

Casting 26 is provided with a pedestal 60 underlying the ram (see also FIGURES 2, 4 and 5). Pedestal 60 forms a support for an adjustable bed 62 upon which part of the applicator assembly is mounted, as will be set forth hereinafter. As pointed out above, the bottom limit of movement of ram 46 is fixed, and in order to facilitate easy adjustments to the height of the region of terminal application, between the bottom of the ram and the top of the bed, mechanism is provided for raising or lowering the surface of bed 62 with respect to pedestal 60. Ordinarily bed 62 is clamped solidly and rigidly to pedestal 60 by a pair of screws 64 and 66. In order to raise or lower bed 62 with respect to pedestal 60 it is necessary only to loosen screws 64 and 66 and to apply adjustments to the height of the bed by turning an adjustment bolt 68. This is accomplished by mechanism now to be described.

As shown in FIGURES 4 and 5, bed 62 incorporates interiorly thereof a pair of triangularly shaped blocks 70 and 71. Block 70 presents a downwardly-facing, sloping surface 72; block 71 presents an upwardly-facing, sloping surface 73. Bolt 68 is threaded through openings in pedestal 60 and carries in threaded engagement upon its central portion a double-acting wedge member 74. Member 74 presents an upwardly-facing, sloping surface 76 in face-to-face contact with surface 72 and a downwardly-facing, sloping surface 77 in face-to-face contact with surface 73. As shown in FIGURE 4, if wedge member 74 is caused by bolt 68 to move to the right, the action of the sloping surfaces 76 and 72 will force bed 62 to move upwardly, where it can be clamped in place by screws 64 and 66. Or if bolt 68 is so turned as to move wedge member 74 to the left, as viewed in FIGURE 4, the action of the sloping surfaces 77 and 73 will force the height of bed 62 with respect to pedestal 60 to be lowered. For a more complete disclosure of the details of the press and its operation reference should be had to the application of Harold E. Cootes filed concurrently herewith.

As will be developed more fully hereinafter the illustrative machine is so constituted that upon each downward stroke of the ram a terminal is separated from a strip of terminals and is crimped at the region of terminal applicaiton. In order to make sure that upon every stroke of the ram a terminal will be available at the region of terminal application and there so oriented as to be received and formed by the crimping dies, all as will be brought out later herein, there is provided a feeding assembly, heretofore indicated at 22, coordinated with the ram action in such fashion that upon every cycle it will present the end terminal of the series without fail in proper position for the next application. Feeding assembly 22 will now be described.

As shown in FIGURE 3 casting 26 carries a rearwardly extending bifurcated bracket 78. Between the two leaves of bracket 78 there is pivotally mounted a feed lever 80. In the illustrative form lever 80 is journaled upon a pin 82 extending through a pair of aligned openings 84 in the leaves of bracket 78. For reasons which will be amplified later in this description it is desirable that the length of the feeding operation performed by assembly 22 shall be readily adjustable and toward this end the leaves of bracket 78 are also provided with aligned pairs of openings 86, 88, 90 and 92; pin 82 may be inserted through any pair of the openings 84, 86, 88, 90 or 92. Lever 80 itself carries a series of five pivot openings, one for each of the five pairs of openings in the leaves of bracket 78. The result of this arrangement is that regardless of which set of openings pin 82 may extend through the general height of lever 80 with respect to bracket 78 does not change. The only change which flows from different settings of pin 82 is the location of the pivot point of lever 80 with respect to bracket 78.

Lever 80 at its top end forms a pivot support for a feed adjustment lever 94 pinned to the top of lever 80 by a pivot pin 96. Toward the bottom of adjustment lever 94 a pair of arms 98 extend inwardly, one on each side of the bottom of feed lever 80. The lowermost portion of feed adjustment lever 94 carries another pair of inwardly extending arms 100 with a pivot pin 102 extending therethrough. On the far end of pivot pin 102, as viewed in FIGURE 3, the right-hand end of a tension spring 104 is secured. The left-hand end of tension spring 104 is secured to a pin 106 set in casing 26. The action of spring 104 is always to urge the lower end of adjustment lever 94 to the left and in a clockwise direction with respect to pivot pin 96. The relationship of the lower end of lever 94 may be adjusted with respect to the lower end of lever 80 against the tension of spring 104 by the setting of an adjustment screw 108 threaded through lever 94 opposite arms 98 and extending therebetween to bear upon the lower end of feed lever 80. The setting of adjustment screw 108 may be locked by means of a locking collar 110 threaded upon the shank of adjustment screw 108 in a position to impose a jamming action upon the threads of screw 108 within lever 94.

Pin 102 forms a swinging pivot support for the upper end of feed finger 112, the lower left-hand end of which as viewed in FIGURE 3, is disposed to execute a pushing action with respect to a series of terminals associated with and directed into the applicator, as will be described later. Whenever the end terminal of the series of terminals is applied to a wire and removed, finger 112 functions automatically in coordination with other movements forming a part of one cycle of operation to feed the series of terminals to the left, as viewed in FIGURE 3, so as to bring the next terminal of the series to the region of terminal application. It is important, of course, in order that the crimping and shearing operations shall accomplish their intended results, that the end terminal be fed not too far and yet far enough.

With a machine embodying my invention it is a simple matter, when adjusting the mechanism to perform a series of operations automatically, to set the end terminal manually in its correct position while the machine is at rest. Each strip of terminals incorporating the invention of the aforementioned Watts application is so constituted that every terminal presents an abutment which serves to receive measured pushing operations imposed upon the strip. If each pushing operation is of the correct length and if the end of the feed stroke is correctly limited, once the strip of terminals has been properly oriented in relation to the shearing and crimping operations, thereafter each feeding operation will successively locate the end terminal in its correct position for another terminal applying operation. In the present embodiment finger 112 is constantly urged in a counterclockwise direction, as viewed in FIGURE 3, by a spring 114 centered upon pin 102 and bearing at one end upon a lower portion of adjustment lever 94 and at its other end upon an intermediate portion of feed finger 112. Thus when feed finger 112 is carried to the right, its lower end rides over the abutment of the next terminal and at once assumes a position to push the next terminal to the left. The extent to which the end of feed finger 112 pushes the strip of terminals to the left can be accurately and easily set while the machine is at rest by adjustments made to screw 108 against the pressure of spring 104, varying the spacing between the lower ends of adjustment lever 94 and feed lever 98.

In order to perform a feeding operation each time that a terminal is applied, I have provided a push rod 116 slidably disposed in a horizontal guideway formed in casting 26 adjacent to the path followed by ram 46. Ram 46 includes a cam surface 118 cut in one of its vertical sides in such position (see FIGURE 3) as to cause push rod 116 to move to the right in simple harmonic motion each time that the ram is bottomed. Each time push rod 116 is moved to the right the lower end of feed lever 80 is caused to move to the right, counterclockwise with respect to pin 82, carrying with it adjustment lever 94. The result is that feed finger 112 is drawn to the right, the lower end of the finger riding over the next terminal of the series until it passes beyond the abutment of the next terminal.

The extent to which the lower end of feed finger 112 is moved to the right is not so critical as the precise limit to which it is moved on the left. The finger must be moved to the right far enough to ride over the abutment of the next terminal in the series and it may travel slightly beyond that point. For even though it does travel a little beyond the next rearward terminal abutment, it will pick up the next terminal on the return feeding stroke when it reaches the abutment and the overtravel will simply be lost motion. The length of the feeding stroke desirable will depend, of course, upon the size and type of the individual terminals in the strip and the spacing between terminals. For a long feeding stroke pin 82 should be positioned in holes 92; for a short stroke it should be positioned in holes 86; and for a stroke of intermediate length it should be adjusted in some set of intermediate holes. I have found that for most cases the feed finger can be caused to ride over the abutment of the next terminal in the series of terminals and not too far beyond merely by selecting some one of the five sets of holes in the leaves of bracket 78 for pin 82. In special cases, certain of the parts of the assembly may be replaced by special parts.

As shown in FIGURE 1 the machine incorporates a strip of terminals indicated at 120 connected in end-to-end fashion and carried upon a reel 122. The reel is supported by a horizontal arm 124 projecting from a post 126 (see also FIGURE 3) carried by a bracket 128 extending from casting 26. The leading end of strip 120 is brought downwardly from reel 122, around a flexible guide 130, below feeding assembly 22, and toward the region of terminal application centered in applicator 24. Reel 122 contains a considerable mass and in order to isolate it from successive jerks applied on strip 120 by feeding finger 112 I provide the guide 130 in the form of a resilient leaf spring which flexes through its inherent resilience to absorb the jerks imposed upon the strip by the feeding mechanism. The result is that the feeding mechanism is enabled regularly to advance the leading end of the strip into the region of application with rapid acceleration and deceleration without interference caused by inertia effects which otherwise would be imposed by the relatively heavy mass carried upon reel 122. The flexing of guard 130 permits the leading end of the strip to advance suddenly and causes the trailing end of the strip to uncoil from the reel gradually and evenly as the strip is consumed.

The leading end of strip 120 advances to the region of application across the upper surface of platform 131 formed by the rearward portion of bed 62 (see also FIGURES 4, 6, 7 and 10). The leading end of strip 120 is supported from below by platform 131 and is prevented from moving sidewise on the surface of the platform, to the right or left as viewed in FIGURE 5, by a pair of guide plates 132 and 134. Guide plate 132 is provided with a pair of adjustment slots 136 and adjustment screws 138. Guide plate 134 similarly is provided with a pair of adjustment slots 140 and adjustment screws 142. By means of these pairs of slots and screws the positions of the guide plates upon the surface of platform 131 may be adjusted, laterally to the right or left as viewed in FIGURE 5, so as to form therebetween a guide channel of controllable width accurately fitted to the particular strip of terminals to be applied. For any given width of strip the guide plates are clamped upon the bed so as to present a channel directed into the region of application and through which the leading end of the strip of terminals loosely but accurately slides.

It is desirable that the leading end of strip 120 be firmly held against platform 131. Accordingly, there is provided a floating drag block 144 (see FIGURES 1 and 3) which overlies the terminal guide channel. Block 144 is retained in place by a pin 146 passing transversely through the block and upon which the block is loosely journaled. Pin 146 is rigidly carried in the upper end 148 of a bell crank lever 150; this lever is pivotally mounted upon a stud 152 set in bed 62. The lower end 154 of the bell crank lever projects downwardly to form a lifting handle by which block 144 may be lifted. Ordinarily the weight of handle 154 acts by gravity to urge block 144 downwardly toward platform 131; for some types of strip it is well to reinforce this action with a spring. When the leading end of a strip of terminals is resting upon platform 131 between plates 132 and 134, the upwardly turned ferrule-forming ears of the trip will ordinarily extend above the surface of plates 132 and 134 so that the bottom surface of drag block 144 will rest upon the ends of the upwardly projecting portions of the strip. Thus drag block 144, with the aid of the downward force supplied by the weight of lever 154, plus any spring force desirable, serves to maintain the advancing end of the strip firmly seated in the guide channel. The friction upon the strip presented by the drag block and its related parts is sufficient to prevent the strip from moving backwardly upon the return stroke of the feeding finger when it moves to the right, as viewed in FIGURE 4, to ride over the next abutment of the adjacent terminal to the rear.

The lowermost portion of feeding finger 112 is centered in the guide channel between plates 132 and 134 and acts between drag block 144 and the region of terminal application. As the feeding mechanism causes the feeding finger to travel forwardly and rearwardly, the lower end of the feeding finger slides to and fro within the guide channel between the region of application on its left (see FIGURE 4) and drag block 144. As pointed out above, when the correct feeding limit of finger 112 has been set by adjustment screw 108, and when a suitable length of feeding stroke has been selected with the aid of adjustment pin 82, the lowermost portion of the feeding finger will ride to and fro within the guiding channel and will push against a terminal feeding abutment on its forward stroke to advance the series of terminals with each cycle of the machine by an amount exactly equal to the distance between terminal abutments. And during the feeding operations plates 132 and 134, with the aid of platform 131 and drag block 144, will continue to guide the advancing end of the strip into its correct position in the region of application.

In the illustrative form the applicator contains die members of the general type described and claimed in the applications of James C. Macy, Serial No. 679,630, filed June 27, 1946, now Patent No. 2,577,126, and Serial No. 717,842, filed December 23, 1946, now Patent No. 2,600,012. Essentially the applicator embodies a series of elements selected from a range of sizes of such elements so as to build in assembly suited to the particular configurations of the illustrated strip 120.

An important feature of my invention stems from the fact that the applicator assembly required for shearing and crimping neatly any desired terminal can be built up from a few easily produced elements selected from an assortment of such elements. In accordance with this feature of my invention a user maintains on hand a stock of shearing blades and plates running through a range of sizes and thicknesses, a stock of crimping dies—males and females—extending over a range of sizes and through different crimp varieties, and an assortment of shims, spacers, and the like. Most of these elements, as will be observed hereinafter, are little more than hardened flat plates, sometimes shaped in certain respects, easily fashioned from tool steel or other suitable material. Each element in itself is relatively inexpensive to manufacture, even with high degree of precision, and the total cost of the elements which, locked in combination, form a unitary subassembly is substantially less than the cost to make a single ordinary tool of equivalent function, e.g., as used in ordinary punch press work. In addition, the various individual elements may be combined in many different ways so as to give the equivalent of many different tools, but at no additional cost. And, of course, worn or dulled elements can be replaced at will without scrapping the entire unit or shutting down while the tools are reworked.

My invention contemplates a system for identifying every element in every size along with a cross-referencing chart reflecting the crimping and shearing requirements of each one of the considerable number of different terminal strips available. Thus, knowing that a certain terminal is to be applied, the means for applying it can be had and put into operation within a matter of minutes merely by selecting from the stock of elements those shown on the chart as necessary for that terminal; for having selected the necessary elements, it is a routine procedure to stack them on bolts in the order shown on the chart and to thread the bolts firmly into place on the ram or bed of the machine, as the case may be. The chart also includes a compilation of the correct settings of feed adjustment pin 82 for each of the different strips of terminals.

In the illustrative form of my invention, FIGURE 9 shows the subassembly carried by ram 46. It includes a shear blade 156, a spacer 158 and a crimper 160. The parts are fastened into the ram by means of screws 162 and 164 passing through aligned holes and threaded into the base of the ram.

As shown in FIGURE 10, the parts of the subassembly carried by bed 62 include a shear plate 166, spacers 168, a slug plate 170, an anvil 172, and an anvil bracket 174. Anvil 172 is screwed to bracket 174 by a screw 176. The parts of the subassembly are clamped in position in bed 62 by screws 178 and 180.

The applicator assembly further includes (see FIGURES 4 and 11) a stripper plate 182 carried upon a stripper bracket 184 secured upon bed 62 by a screw 186. In addition, the assembly includes (see FIGURES 4 and 12) a guard plate 188 adjustably secured upon bed 62 by screws 190 and 192 passing through a slot 194 in the plate.

In the embodiment illustrated in FIGURE 10, screws 138 (see FIGURE 6) thread into openings 194 in bed 62. Screws 142 are threaded into openings 196. Screw 178 threads into opening 198 and screw 180 threads into opening 200. Screws 190 and 192 thread into openings 202 and 204 and screw 186 threads into opening 206.

It will be appreciated that upon each cycle of the machine a shearing and a crimping operation are performed. The end terminal is sheared from the series of terminals and is crimped onto a wire oriented within the region of application. In some instances, depending upon the character of the terminal to be fabricated, it is convenient to shear a slug from between the end terminal and the next terminal and, where a slug is to be removed from the strip, slug plate 170 may also function as a shearing plate along with shear plate 166. In this instance shear blade 156 completes a severing operation against each of the members 166 and 170. The width of the slug so removed will depend upon the width of blade 156 and the corresponding spacers 168.

Figure 7:
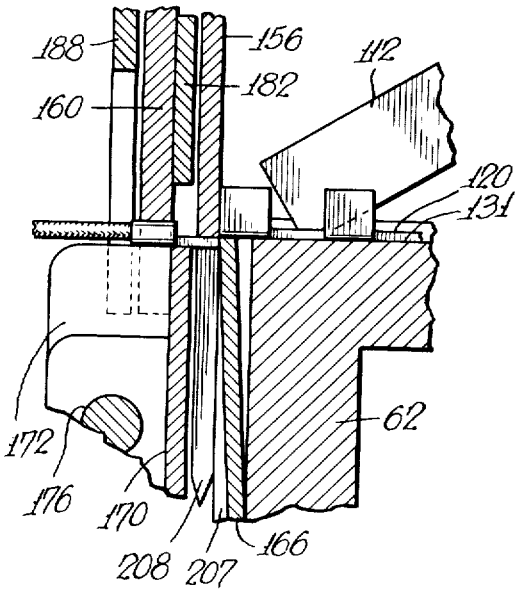
FIGURE 7 is an enlarged fragmentary perspective view of some of the parts illustrated in FIGURE 4 shown at the completion of a crimping stroke.
Figure 8:
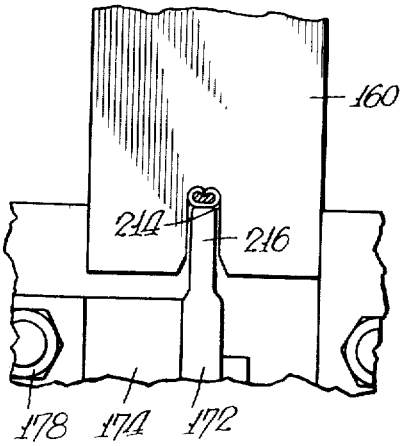
FIGURE 8 is a fragmentary perspective view of some of the parts illustrated in FIGURE 7 taken from the left as viewed in FIGURE 7.

As illustrated in FIGURE 7, the central portion of shear plate 166, below its shearing edge, is obliquely relieved, as indicated at 207, so that in those instances where plate 166 is used in removing a slug a clearance space will be presented through which the slug may be ejected. I have found it useful to provide such elements as shear plate 166 with cutting edges on both top and bottom so that when one edge becomes dulled the element may be inverted and efficient production may promptly be continued.

As also illustrated in FIGURE 7, blade 156 is provided with a pair of heels 208 which at all times remain in sliding relationship within the subassembly clamped upon bed 62 and between spacers 168. Bed 62 is provided with a slot 210 into which the lower ends of heels 208 may pass when the ram bottoms and through which a slug may fall in those instances when a slug is sheared from between adjacent terminals. As shown in FIGURE 5 a sloping surface 212 is provided below slot 210 for diverting slugs outwardly from the machine where they may be collected as scrap material.

The purpose of stripper plate 182 is to dislodge those terminals which, after the ram bottoms, tend to stick in the female crimper. The purpose of guard plate 188 is to assure that the operator shall not inadvertently have a finger in the region of application when the ram bottoms. A slot 214 in plate 188 straddles die portion 216 of anvil 172 and together slot 214 and the die surface aid in funneling the ends of the wires correctly into the region of application. FIGURE 4 illustrates that when the parts are at rest the leading terminal is in crimping position on the surface of the die portion of anvil 172.

As best shown in FIGURE 3, casting 26 is fitted with a counter 218 operated by a push rod 220 cooperating with a cam surface 222 cut in ram 46. Thus, each time the ram bottoms the counter registers the next higher number. Such counters are generally well known in the art.

From the foregoing it will be seen that an automatic terminal applying construction made in accordance with the present invention is well adapted to attain the ends and objects hereinbefore set forth and to be economically installed and operated since both the construction and its methods of operation and use are suited to common production practices and are susceptible to a wide latitude of variations as may be desirable in adapting the invention to different applications.

Altho I have described the invention above as applied to a particular type of pneumatic press and with a particular type of terminal connector, it will be apparent to those skilled in the art that it is generally applicable with other types of presses and with other types of electrical connectors whether fed in integral strip form or otherwise to the crimping position.

I claim:

1. A connector applicator mechanism for applying a plurality of different sized and shaped connectors onto wires comprising a press including ram and bed members each having an open wall, a multiple element die assembly including in combination opposed subassemblies adapted for relative reciprocal movement, each of said subassemblies comprising a plurality of replaceable die elements with at least one of said elements being adapted to project into interleaved relation between portions of the opposed said subassembly, and subassemblies including crimper and anvil elements and a severing element spaced from said crimper and anvil for severing the lead connector from a connector strip, and stacking means for aligning said subassemblies into respective units and affixing said units to the ram and bed walls respectively whereby a desired die set may be quickly and easily assembled from various combinations of elements.

2. A connector applicator mechanism for applying a plurality of different sized and shaped connectors from a substantially continuous connector strip onto wires comprising a press including ram and bed members each having an open side wall, a multiple element die assembly including in combination opposed subassemblies adapted for relative reciprocal movement, each subassembly comprising a plurality of replaceable die elements having a pair of mounting holes therein with at least one of said elements being adapted to project into interleaved relation between portions of the opposed subassembly, said subassemblies including crimper and anvil elements and a severing element spaced from said crimper and anvil for severing the lead connector from the connector strip, and a pair of aligned bolts fitted to said holes to hold thereon the elements of said respective subassemblies and adapted to clamp them to the ram and bed walls respectively whereby a desired set may be quickly and easily assembled from various combinations of elements.

3. A connector applicator mechanism for applying a plurality of different sized and shaped connectors onto wires comprising a press including ram and bed members each having an open wall, a multiple element die assembly including in combination opposed subassemblies adapted for relative reciprocal movement, each of said subassemblies comprising a plurality of replaceable die elements, said subassemblies including crimper and anvil elements and a severing element spaced from said crimper and anvil for severing the lead connector from a connector strip, and stacking means for aligning said subassemblies into respective units and affixing said units to the ram and bed walls respectively whereby a desired die set may be quickly and easily assembled from various combinations of elements.

*4. A connector applicator machine for applying a plurality of different sized and shaped connectors onto wires comprising a press including ram and bed members each having an open wall, a multiple element die assembly including in combination opposed subassemblies adapted for relative reciprocal movement, each of said subassemblies comprising a plurality of replaceable die elements with at least one of said elements being adapted to project into interleaved relation between portions of the opposed said subassembly, said subassemblies including crimper and anvil elements and a severing element spaced from said crimper and anvil for severing the lead connector from a connector strip, stacking means for aligning said subassemblies into respective units and affixing said units to the ram and bed walls respectively whereby a desired die set may be quickly and easily assembled from various combinations of elements, means for storing a supply of preformed connectors sufficient for substantial operation, and feeding means for sequentially advancing said connectors into said machine and in operative relation to said die assembly, said feeding means having an adjustable stroke for coordinating the connector feed with the pitch distance of said die assembly, whereby to accurately position for application the connectors of said different size and shape, respectively.*

*5. A connector applicator machine for applying a plurality of different sized and shaped connectors from a substantially continuous connector strip of preformed connectors onto wires comprising a press including ram and bed members each having an open side wall, a multiple element die assembly including in combination opposed subassemblies adapted for relative reciprocal movement, each subassembly comprising a plurality of replaceable die elements having a pair of mounting holes therein with at least one of said elements being adapted to project into interleaved relation between portions of the opposed subassembly, said subassemblies including crimper and anvil elements and a severing element spaced from said crimper and anvil for severing the lead connector from the connector strip, a pair of aligned bolts fitted to said holes to hold thereon the elements of said respective subassemblies and adapted to clamp them to the ram and bed walls respectively whereby a desired set may be quickly and easily assembled from various combinations of elements, and feeding means adapted to draw preformed connectors of said strip sequentially from a supply thereof into the machine and to said die assembly, said feeding means being adjustable for properly positioning the lead connector on the die elements selected to apply connector strip of a particular size and shape.*

*6. A connector applicator machine for applying a plurality of different sized and shaped connectors onto wires comprising a press including ram and bed members each having an open wall, a multiple element die assembly including in combination opposed subassemblies adapted for relative reciprocal movement, each of said subassemblies comprising a plurality of replaceable die elements, said subassemblies including crimper and anvil elements and a severing element spaced from said crimper and anvil for severing the lead connector from a connector strip, stacking means for aligning said subassemblies into respective units and affixing said units to the ram and bed walls respectively whereby a desired die set may be*

*quickly and easily assembled from various combinations of elements, and a connector strip feed mechanism for drawing into the machine sequentially the connectors of said strip, said feed mechanism having a plurality of settings corresponding to different feed strokes required by the different size and shape strip connectors, and the various combinations of elements therefor, respectively.*

References Cited in the file of this patent or the original patent

UNITED STATES PATENTS

| | | |
|---|---|---|
| 208,600 | Hodel | Oct. 1, 1878 |
| 242,772 | Halkyard | June 14, 1881 |
| 259,597 | Smith | June 13, 1882 |
| 272,787 | Smith | Feb. 20, 1883 |
| 1,284,706 | Kempton | Nov. 12, 1918 |
| 1,333,574 | Pothier | Mar. 9, 1920 |
| 1,389,618 | Bingham | Sept. 6, 1921 |

| | | |
|---|---|---|
| 1,399,101 | Bowman | Dec. 6, 1921 |
| 1,575,670 | Wroblewski | Mar. 9, 1926 |
| 1,743,364 | Liss | Jan. 14, 1930 |
| 1,836,497 | Phelps | Dec. 15, 1931 |
| 1,836,503 | Poole | Dec. 15, 1931 |
| 1,873,125 | Holmes et al. | Aug. 23, 1932 |
| 2,024,416 | Allison | Dec. 17, 1935 |
| 2,169,802 | Keller | Aug. 15, 1939 |
| 2,267,782 | Behrens | Dec. 30, 1941 |
| 2,310,033 | Muther | Feb. 2, 1943 |
| 2,339,410 | Keller | Jan. 18, 1944 |
| 2,340,448 | Andren | Feb. 1, 1944 |
| 2,396,913 | Carlson | Mar. 19, 1946 |
| 2,409,147 | Neuhaus | Oct. 8, 1946 |
| 2,418,761 | Dasher | Apr. 8, 1947 |
| 2,438,023 | Sirp | Mar. 16, 1948 |
| 2,473,623 | Voity | June 26, 1949 |
| 2,567,155 | Macy | Sept. 4, 1951 |
| 2,631,213 | Martines | Mar. 10, 1953 |